US005461299A

United States Patent [19]
Bruni

[11] Patent Number: 5,461,299
[45] Date of Patent: * Oct. 24, 1995

[54] WEATHERIZED CURB-SIDE CHARGER

[75] Inventor: Michael F. Bruni, Hermosa Beach, Calif.

[73] Assignee: Hughes Aircraft Company, Los Angeles, Calif.

[*] Notice: The portion of the term of this patent subsequent to Jun. 21, 2011 has been disclaimed.

[21] Appl. No.: 179,833

[22] Filed: Jan. 6, 1994

Related U.S. Application Data

[63] Continuation of Ser. No. 823,945, Jan. 22, 1992, abandoned.

[51] Int. Cl.$^6$ ..................................................... H02J 7/00
[52] U.S. Cl. ..................................................... 320/2; 320/21
[58] Field of Search ................................. 320/2, 21, 7

[56] References Cited

U.S. PATENT DOCUMENTS

| | | | |
|---|---|---|---|
| 3,529,229 | 9/1970 | Kennedy | 320/2 |
| 3,641,336 | 2/1972 | Boin | 320/2 X |
| 4,383,210 | 5/1983 | Wilkinson | 320/2 |
| 4,496,896 | 1/1985 | Melocik et al. | 320/21 X |
| 4,532,418 | 7/1985 | Meese et al. | 320/2 X |
| 5,216,402 | 6/1994 | Carosa | 336/66 |
| 5,323,099 | 6/1994 | Bruni et al. | 320/2 |

Primary Examiner—Kristine L. Kincaid
Assistant Examiner—Nicholas Ponomarenko
Attorney, Agent, or Firm—Leonard A. Alkov; W. K. Denson-Low

[57] ABSTRACT

A weatherized curb-side battery charging system that provides a mechanism for transferring electrical power to an electric vehicle to recharge its battery. The battery charging system includes a housing that is typically located at the side of a street on the curb, or at a battery charging station, for example. A retractable charging device is coupled to a power supply and mates with a receptacle device disposed in the vehicle. A variety of charging devices that may be employed in the battery charging system are disclosed. Electronic circuitry controls power supplied to the vehicle from the power supply of the charging system. In addition, an interface circuit is provided that allows a user to enter a code to use the system and that provides an identification for billing purposes, or a credit card type key that activates the system and performs the same functions. A fan is provided for cooling purposes that causes an air flow through the system. The curb-side charging system thus permits an operator of an electric vehicle to charge its battery in a convenient manner. The battery charging system allows an electric vehicle to be charged safely without any type of conventional electrical plug. The battery charging system provides a safe, convenient and weatherproof mechanism for coupling power from a voltage source to an electric vehicle to recharge its battery.

17 Claims, 7 Drawing Sheets

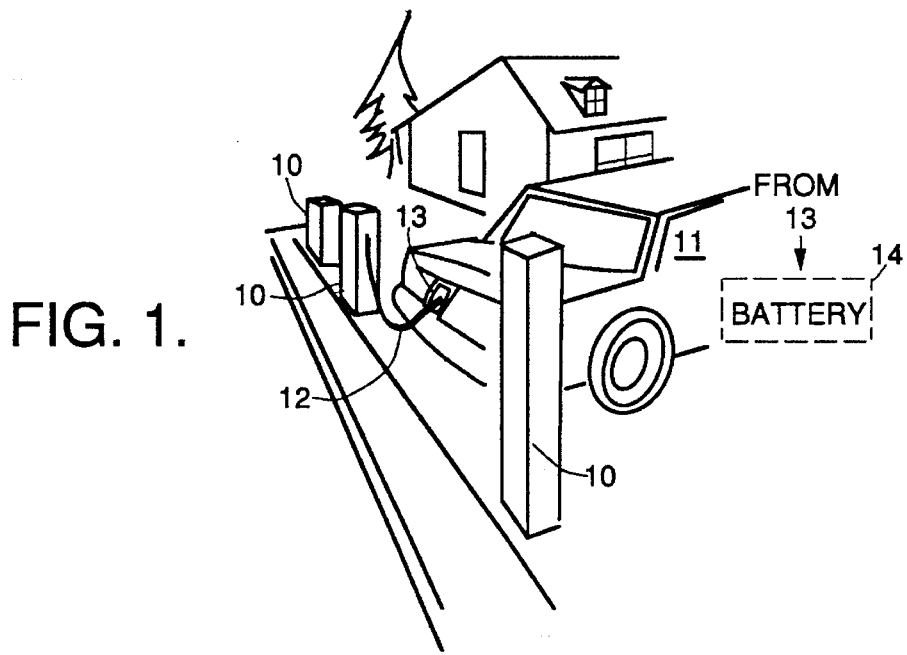
FIG. 1.
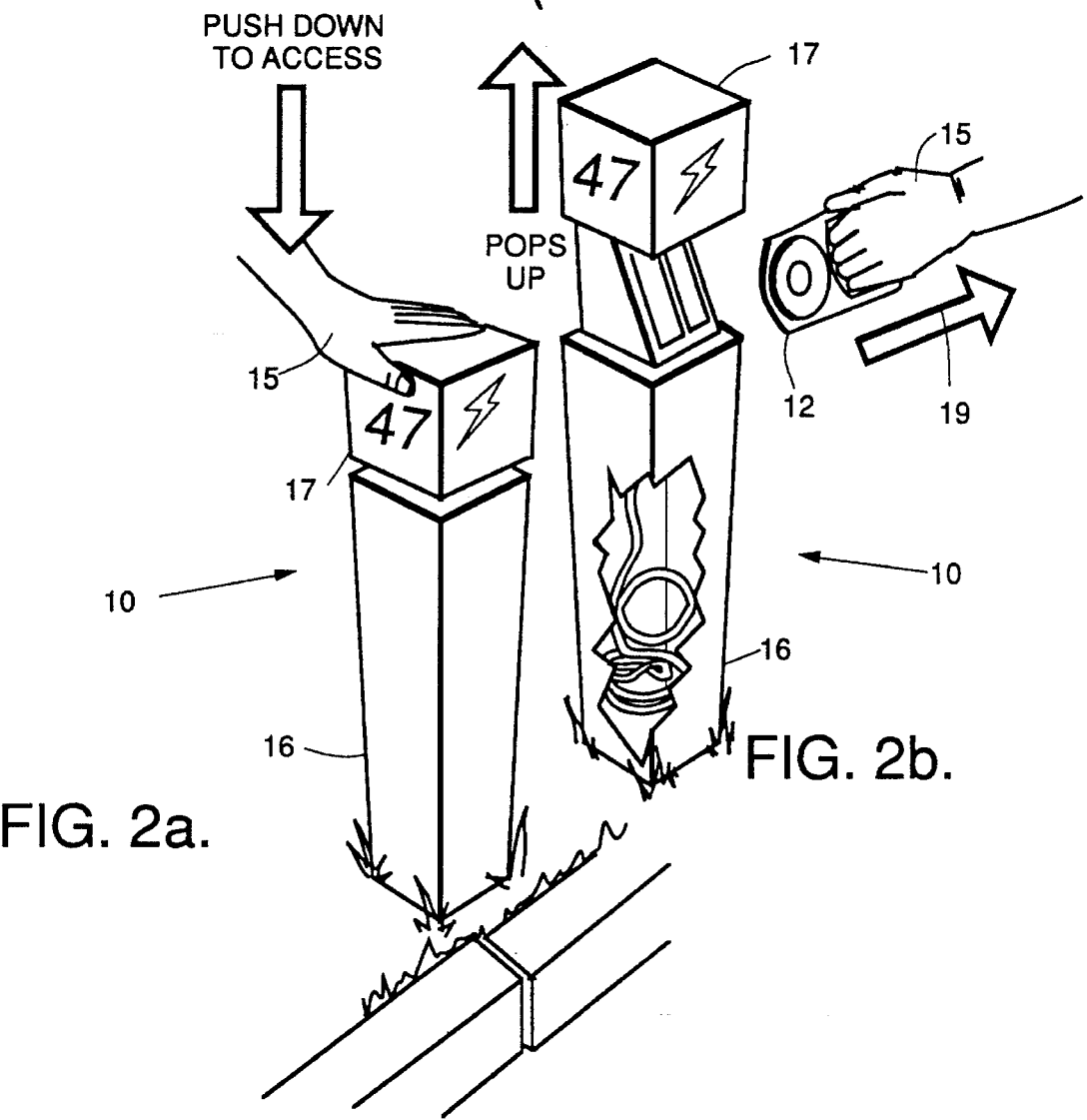
FIG. 2a.
FIG. 2b.

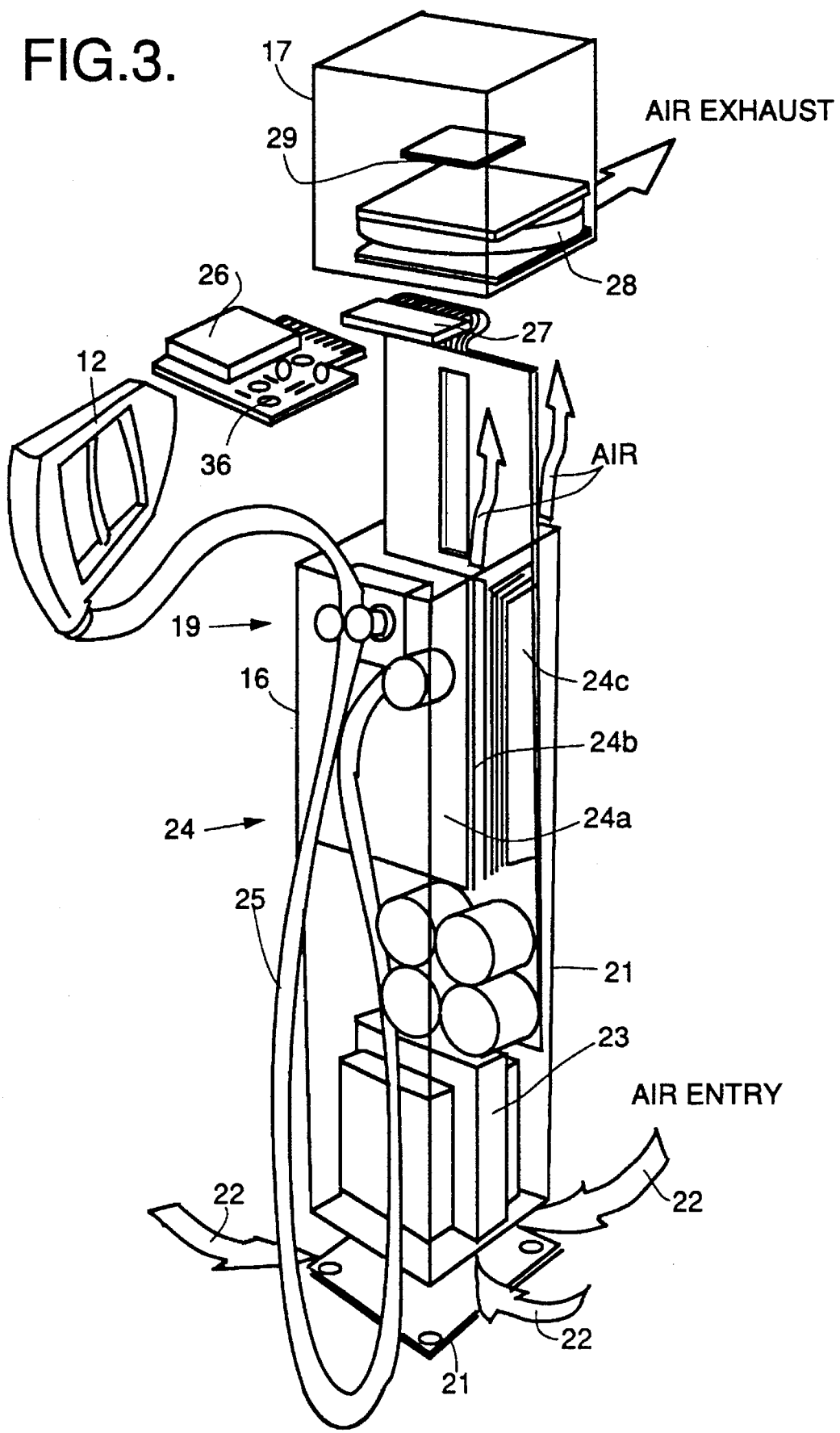

WEATHERIZED CURB-SIDE CHARGER

CROSS REFERENCE TO RELATED APPLICATIONS

This is a continuation-in-part of application Ser. No. 07/823,945 filed Jan. 22, 1992, now abandoned.

Cross reference is made to the following copending patent applications, the contents of which are incorporated herein by reference: "Hand-Held Inductive Charger Having Flat Mating Cores", Ser. No. 07/823,945, filed Jan. 22, 1992, now abandoned "Hand-Held Inductive Charger Having Concentric Windings", Ser. No. 07/823,949, filed Jan 22, 1992; now U.S. Pat. No. 5,327,065 and "Separable Inductive Coupler", Ser. No. 07/823,944, filed Jan. 22, 1992, now U.S. Pat. No. 5,216,402.

BACKGROUND

The present invention relates to battery charging systems, and more particularly to a battery charging system that is adapted for use in charging propulsion batteries of electric automobiles, and the like.

With the development of electric powered automobiles and the push towards their production for relatively widespread consumer use within the next ten years, there is a need for a means to easily charge the propulsion batteries contained therein. Conventional battery charging devices are not well suited for this purpose. In particular, conventional battery chargers are not designed for frequent use by consumers, and it is not easy to charge batteries on a regular basis using conventional chargers.

Consequently, it is an objective of the present invention to provide for a battery charging system that is adapted for use in an automobile battery charging device, or the like, that is simple to use and is adapted to efficiently charge an automobile battery employed in an electrically powered automobile.

SUMMARY OF THE INVENTION

In order to meet the above and other objectives, the present invention provides for a weatherized curb-side battery charging system that provides a means for transferring electrical power from a power source to an electric vehicle. The battery charging system of the present invention comprises a housing that is disposed at the side of a street on the curb, or at a battery charging station, for example, and a retractable charging device that is disposed in the housing that is adapted to mate with a receptacle device disposed in the vehicle. A variety of charging devices may be employed in the battery charging system. The curb-side battery charging system also comprises a power supply and electronic circuitry coupled to the power supply that controls power supplied to the vehicle by the charging system. In addition, an interface circuit is provided that provides a means for a user to enter a code for use and billing purposes, or a credit card type key that activates the system. A fan is provided for cooling purposes that causes an air flow through the system.

One charging device for use in the curb-side battery charging system comprises a removable primary coil assembly having a cylindrical housing. A cylindrical primary core is disposed in the primary housing, and a doughnut-shaped primary winding is disposed the cylindrical primary core. An electrical cable coupled to the primary winding that is adapted to couple power thereto from the power supply. The secondary coil assembly includes a receptacle housing disposed in the vehicle, a cylindrical secondary core is disposed in the receptacle housing, and a doughnut-shaped secondary winding is disposed in the secondary core. The secondary winding is coupled to the battery of the vehicle. The primary and secondary coil assemblies form a transformer when the respective primary and secondary windings are mated.

A second charging device is substantially the same as the first, but the secondary coil assembly includes a cylindrical secondary core, and first and second concentric secondary windings are disposed in the secondary core. The first and second concentric secondary windings are coupled to the battery of the vehicle. The first and second concentric secondary windings have a gap therebetween that is adapted to receive a circular primary winding therein. The primary and secondary coil assemblies form a transformer when the respective primary and secondary windings are mated.

A third charging device is also similar to the first and second, but the coupler comprises a removable primary coil that includes a housing, a primary winding having an opening therein, and an electrical cable coupled to the primary winding that couples power from the power source. A secondary coil includes first and second matable magnetic core sections, each core section having a secondary winding hat is coupled to the battery. The fast and second matable magnetic core sections are separable to provide for open and closed positions, and the primary coil is insertable between the first and second matable magnetic core sections when they are in the open position. The primary and secondary coils form a transformer when the respective first and second matable magnetic core sections are in the closed position.

In operation, an operator presses down on the top of the charger to access the charging handle. The operator then inserts the hand-held charging device into the electric vehicle to charge it by placing the charging device into a receptacle in the electric vehicle. The charging device is then energized with electrical current. This causes the primary and secondary cores of the charging device to couple magnetically thus causing current to flow in the secondary. Current flowing in the secondary is rectified and sent to the battery of the electric vehicle to charge it. Upon completion of charge, the charging device is returned to the curb-side charger by means of a retraction mechanism. The curb-side charger may be left open or closed until the next charge.

The purpose of the curb-side charging system of the present invention is to allow an operator of an electric vehicle to charge its battery. The advantage of the present charging system is that an electric vehicle may be charged safely without the use of a conventional electrical plug. The charging system of the present invention thus provides a safe, convenient and weatherproof means for coupling power from a power source to an electric vehicle to recharge its propulsion battery.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows a typical curb-side battery charging system installation in accordance with the principles of the present invention;

FIGS. 2a and 2b show a close-up perspective views of the curb-side battery charging system of FIG. 1 illustrating its use;

FIG. 3 shows a exploded perspective view of the curb-side battery charging system of FIG. 1;

DETAILED DESCRIPTION

Figure 4:
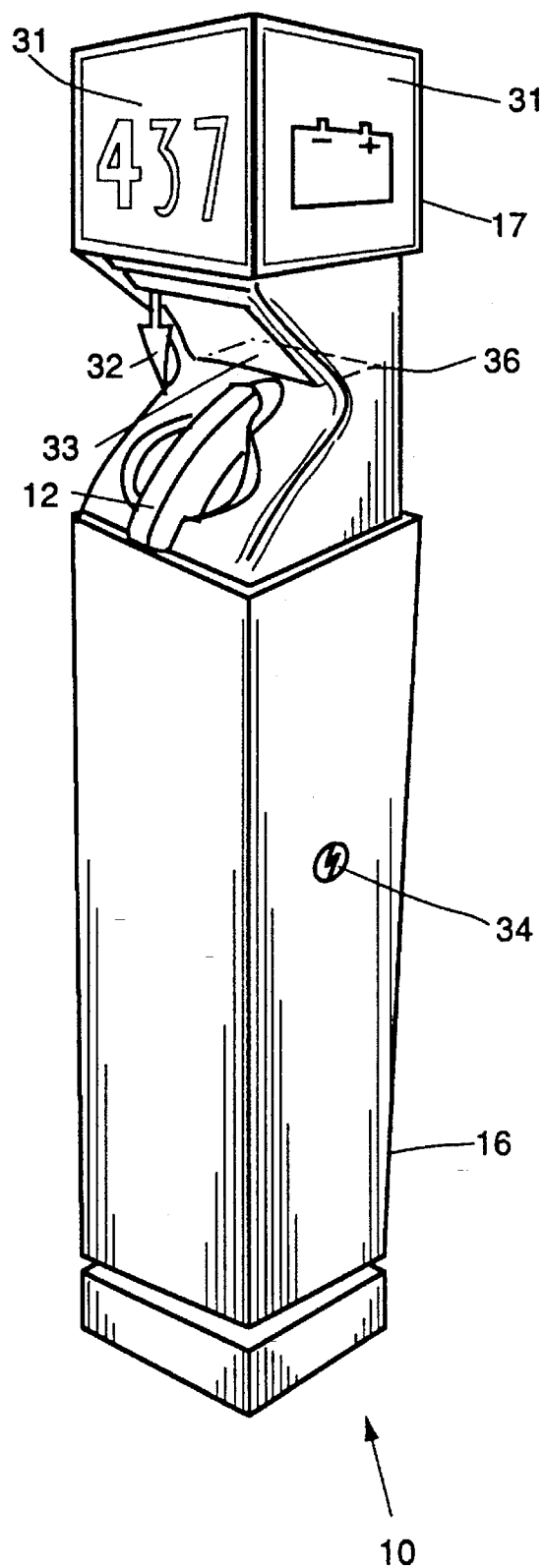
FIG. 4 shows an exterior view the curb-side battery charging system of FIG. 3.

FIG. 1 shows a typical installation of a weatherized curb-side battery charging system 10 in accordance with the principles of the present invention. The battery charging system 10 is shown located in an area wherein an electric vehicle 11 may park and charge its propulsion battery 14. This is accomplished by means of a retractable charging device 12 that is inserted into a receptacle 13 located in the vehicle 11 that cooperates to couple power from the battery charging system 10 to the battery 14.

FIGS. 2a and 2b show a close-up perspective views of the curb-side battery charging system 10 illustrating its use. In FIG. 2a, the curb-side battery charging system 10 is opened by a user 15 by depressing a spring-loaded or hinged top portion 17 of a housing 16. As shown in FIG. 2b, the top portion 17 of the housing 16 pops up to expose the retractable battery charging device 12 that is extended (illustrated by an arrow 19) to mate with the receptacle 13 in the vehicle 11.

FIG. 3 shows a exploded perspective view of the curb-side battery charging system 10. The housing 16 is shown attached to a sidewalk or curb by means of a mounting plate 21. A lower portion 22 of the housing 16 is separated from the mounting plate 21 to permit air flow (illustrated by arrows 22) through the housing 16. A power supply 23 is located in the lower portion 21 of the housing 16. The power supply 23 is coupled to electronic circuitry 24 (illustrated by three printed circuit boards 24a, 24b, 24c) that controls the flow of power to the vehicle 11. Power is coupled from the electronic circuitry 24 by way of a cable 25 to the charging device 12. The electronic circuitry 24 may comprise conventional power converter circuitry, for example, that converts an applied line voltage into power useable by the system 10, along with circuitry that controls lights and fans, etc., that form part of the system 10.

In the top portion 17 of the housing 16, an interface printed circuit board 26 is located that provides for the user 15 to access and control the system 10. The interface printed circuit board 26 is coupled to the electronic circuitry 24 by way of a cable 27. A retracting mechanism 19 is used to return an extended charging device 12 to its storage position within the housing 16. The cable 27 of the charging device is stored within the bottom portion of the housing 16. The retraction of the charging device is accomplished using a conventional air or water retraction mechanism, for example. The top portion 17 of the housing is also vented to permit air to escape therefrom. The air flow is provided by means of a fan 28 controlled by the electronic circuitry 24 located near the top of the top portion 17 of the housing 16. A lighting device 29 is provided at the top of the housing 16 that may be controlled by the electronic circuitry 24 to illuminate the system 10 in the area where the interface printed circuit board 26 is located. This is required, since the system 10 is controlled from a keypad or credit card type key that permits the user 15 to operate the system 10.

FIG. 4 shows an exterior view the curb-side battery charging system 10 in a fully assembled condition. In the top portion 17 of the housing 16, a variety of back-lighted labels 31 are provided. These labels 31 indicate a system number and the nature of the system 10, illustrated by a picture of a battery as one of the labels 31. The lighting also shines downward (illustrated by an arrow 32) to illuminate the charging device 12 and a keypad or card reader used to operate the system 10. The keypad 36 or card reader 36 is located behind a hinged door 33 that is opened by the user 15 to operate the system 10. Access to the system 10 may be prevented by means of a key lock 34 located on the side of the housing 16. This lock prevents the top portion 17 from popping up when it is depressed by the user 15.

Figure 5:
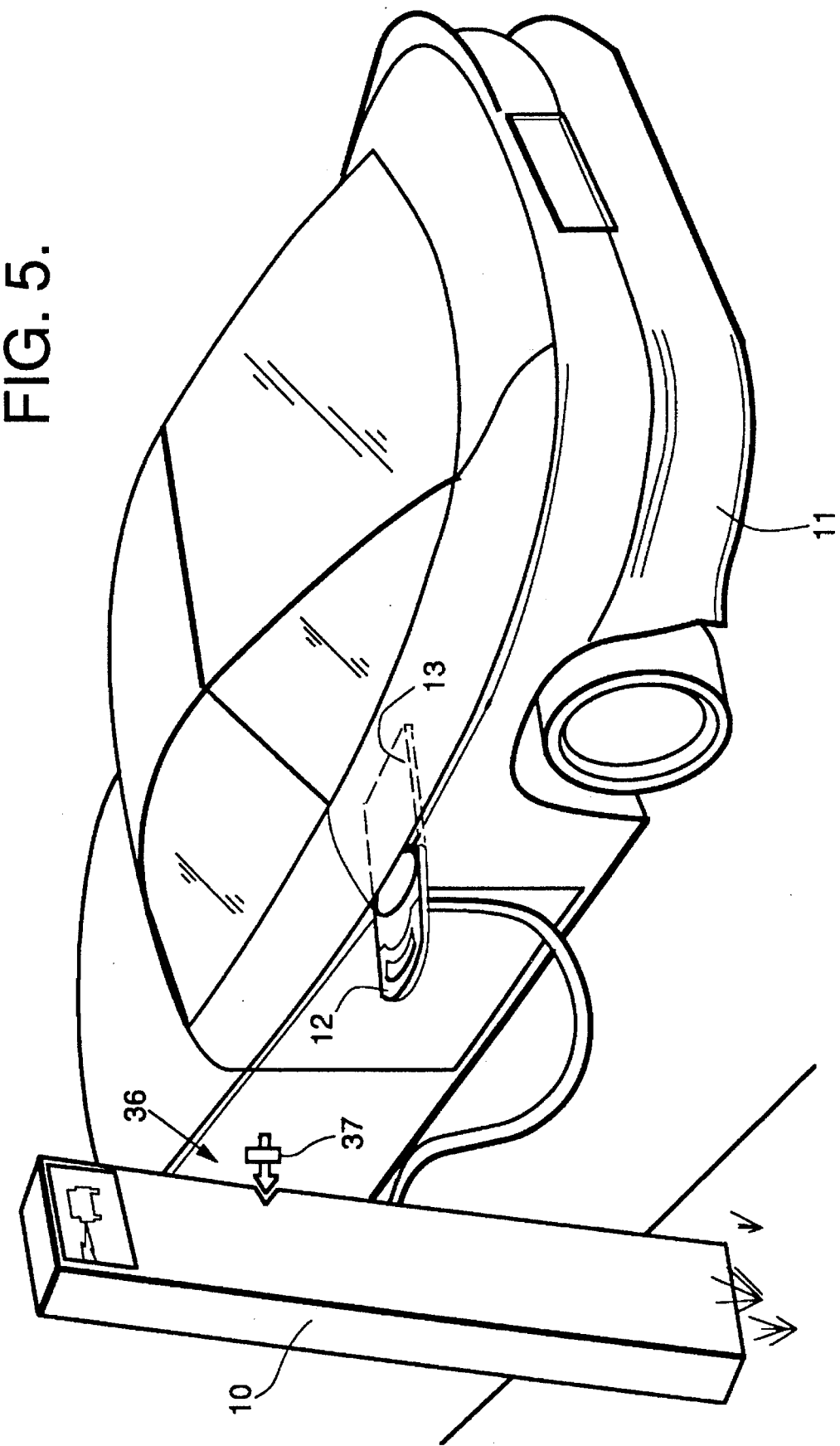
FIG. 5 illustrates the curb-side battery charging system of FIG. 1 in use with a vehicle.

FIG. 5 illustrates a second embodiment of the curb-side battery charging system 10 (having a different shape) in use with the vehicle 11. The battery charging device 12 is shown extended from the system 10 and inserted into the receptacle 13 in the vehicle 11. A credit card key 37 is shown being inserted into the credit card reader 36 in order to operate the system 10.

In operation, the user 15 presses down on the top portion 17 of the charging system 10 to access the charging device 12. The user places the hand held charging device 12 into the receptacle 13 in the electric vehicle to charge its battery 14. The credit card key 37 is inserted into the card reader 36, and an access code is entered, or the card is read by the card reader 36 in a manner similar to conventional self serve gas pump card readers. Power is then transferred from the system 10 to the battery 14 of the vehicle 11. Upon completion of the charging operation, the charging device 12 is returned to the curb-side charging system 10. The curb-side charging system 10 may be left open or may be closed in awaiting the next charging operation.

For purposes of completeness, various charging devices 12 may be employed for use in the system 10. These devices 12 are fully described in copending patent applications assigned to the assignee of the present invention, the contents of which are incorporated herein by reference. These devices include a "Hand-Held Inductive Charger Having Flat Mating Cores", Ser. No. 07/823,948, filed Jan. 22, 1992, now abandoned, a "Hand-Held Inductive Charger Having Concentric Windings", Ser. No. 07/823,949; filed Jan. 22, 1992, now U.S. Pat. No. 5,327,065 and a "Separable Inductive Coupler", Ser. No. 07/823,944, filed Jan. 22, 1992, now U.S. Pat. No. 5,216,402. These devices are described below with reference to FIGS. 6–8.

Figure 6:
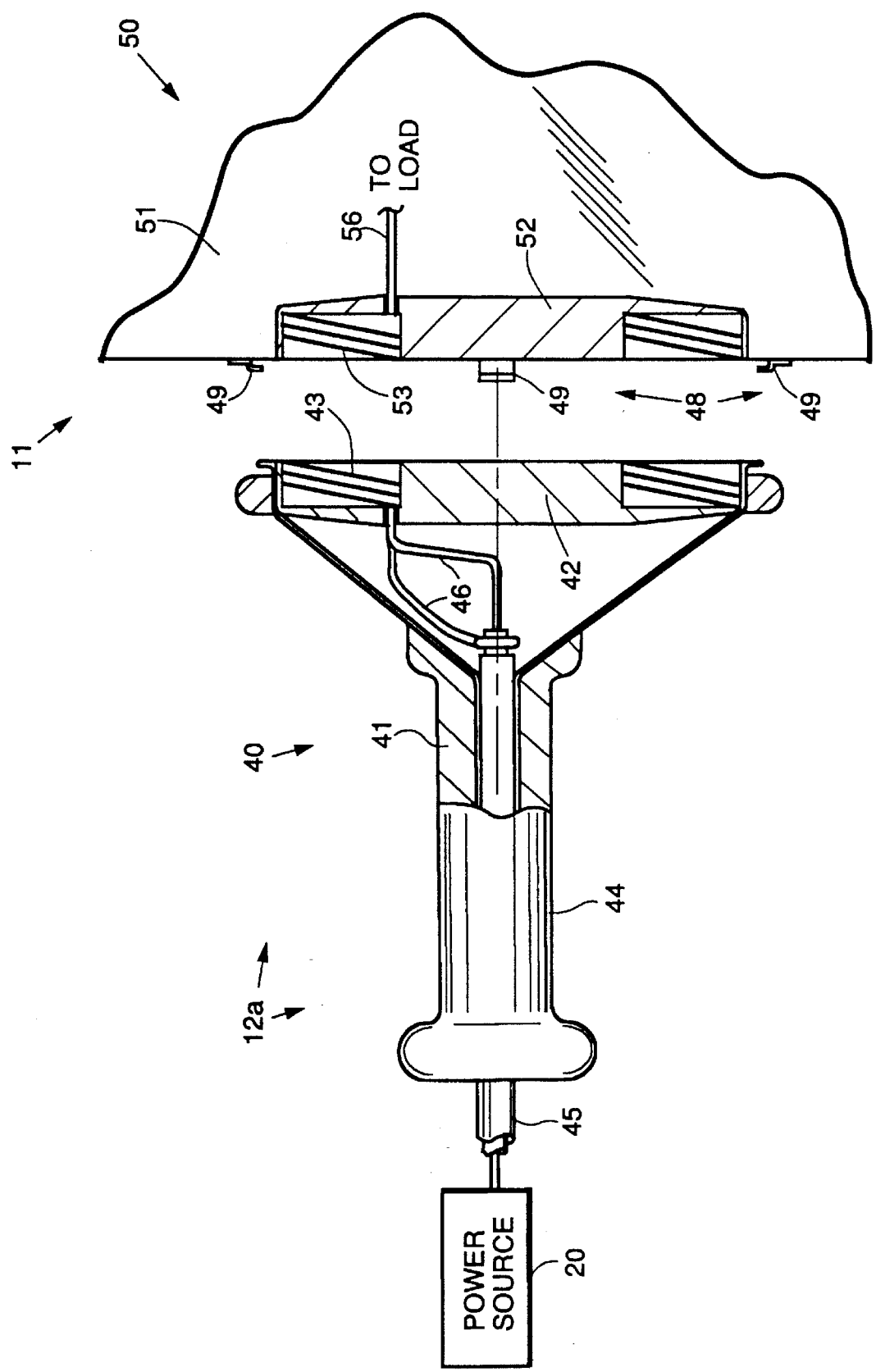
FIGS. 6, 7, 8a and 8b show three charging devices that may be employed in the system of the present invention.

FIG. 6 shows a partial cutaway view of the first charging device 12a having flat mating cores. The first charging device 12a is adapted to provide a means for coupling power from the high frequency power source 20 to the vehicle 11 in order to recharge its propulsion battery 14. The first charging device 12a comprises a removable primary coil assembly 40 having a cylindrical housing 41. A cylindrical primary core 42 is disposed in the housing 41, and a doughnut-shaped primary winding 43 is disposed in the cylindrical primary core 42. A portion of the housing 41 forms a handle 44. A coaxial electrical cable 45, or other low inductance transmission line, is coupled to the primary winding 43 and is adapted to couple power thereto from the external power source 20. The cable 45 is coupled to the primary winding 48 and the housing 41 by way of soldered or welded electrical leads 46.

The first charging device 12a also comprises a secondary coil assembly 50 having a receptacle housing 51. A cylindrical secondary core 52 is disposed in the receptacle housing 51, and a secondary winding 53 is disposed in the secondary core 52. The secondary winding 53 is coupled to the battery 14 by way of electrical conductors 56. The primary and secondary coil assemblies 40, 50 form a transformer when the respective primary and secondary windings 43, 53 are mated. The windings 43, 53 may be comprised of copper, for example, while the cores 42, 52 may be comprised of ferrite, for example. It should be clear from FIG. 6 that when the primary and secondary coil assemblies 40, 50 are mated, the first charging device 12a provides for a transformer mechanism that is relatively compact and provides an efficient means for coupling energy from the power source 20 to the battery 14. A retaining means 48, such as retaining clips 49 or other convenient receptacle, is provided for securably holding the removable primary coil assembly 40 in close proximity to the secondary coil assembly 50 so that the primary and secondary windings 43, 53 and cores 42, 52 are adjacent to each other.

In operation, the user 15 holds the handle 44 of the protective housing 41 of the primary coil assembly 40 and inserts it into retaining means 48 formed by retaining clips 48. The primary winding 43 is energized with electrical current from the power supply 23. This causes the primary core 42 and secondary core 52 to couple magnetically thus causing current to flow in the secondary winding 53. Current flowing in the secondary winding 53 is rectified and coupled to the battery 14 of the vehicle 11 to charge it via the conductor 56.

Figure 7:
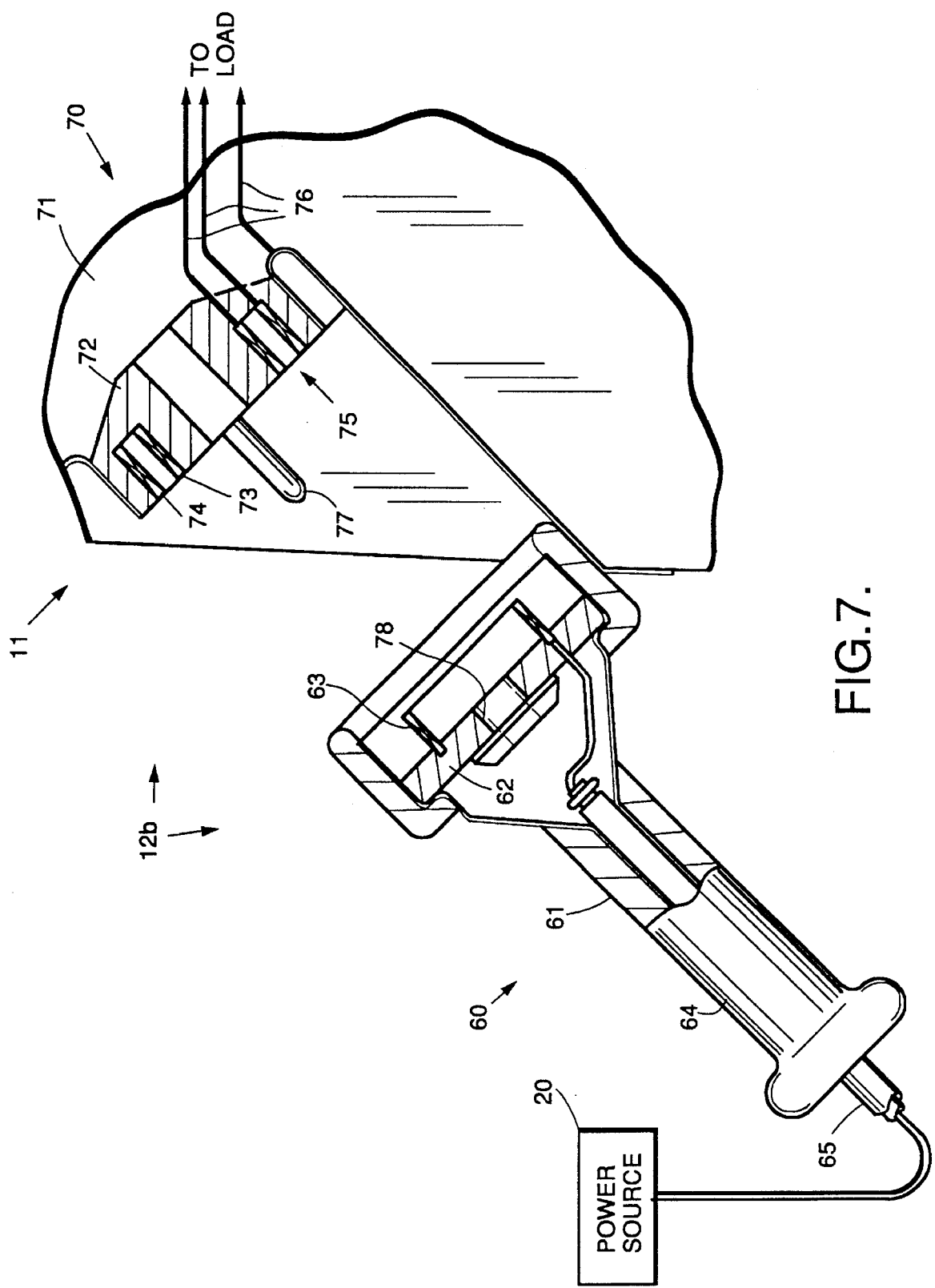

Referring to FIG. 7, it shows a partial cutaway view of a second charging device 12b having concentric windings. The second charging device 12b comprises a removable primary coil assembly 60 having a cylindrical housing 61. A cylindrical primary core 62 is disposed in the housing 61, and a circular primary winding 63 is disposed in and protrudes from the cylindrical primary core 62. A portion of the housing 61 forms a handle 64. A coaxial electrical cable 65, or other low inductance transmission line, is coupled to the primary winding 63 that is adapted to couple power thereto from the power source 20.

The second charging device 12b also comprises a secondary coil assembly 70 having a receptacle housing 71. A cylindrical secondary core 72 is disposed in the receptacle housing 71, and fast and second concentric secondary windings 73, 74 are disposed in the secondary core 72. The first and second concentric secondary windings 73, 74 are coupled to the battery 14 by way of electrical conductors 76. The first and second concentric secondary windings 73, 74 have a gap 75 therebetween that is adapted to receive the circular primary winding 63 therein. The windings 63, 73, 74 may be comprised of copper, for example, while the cores 62, 72 may be comprised of ferrite, for example. The primary and secondary coil assemblies 60, 70 form a transformer when the respective primary and secondary windings 63, 73, 74 are mated. An alignment pin 77 is shown that is adapted to mate with an opening 78 in the secondary coil assembly 20. The alignment pin 77 may be made of an epoxy-glass composition, for example.

Figure 8A:
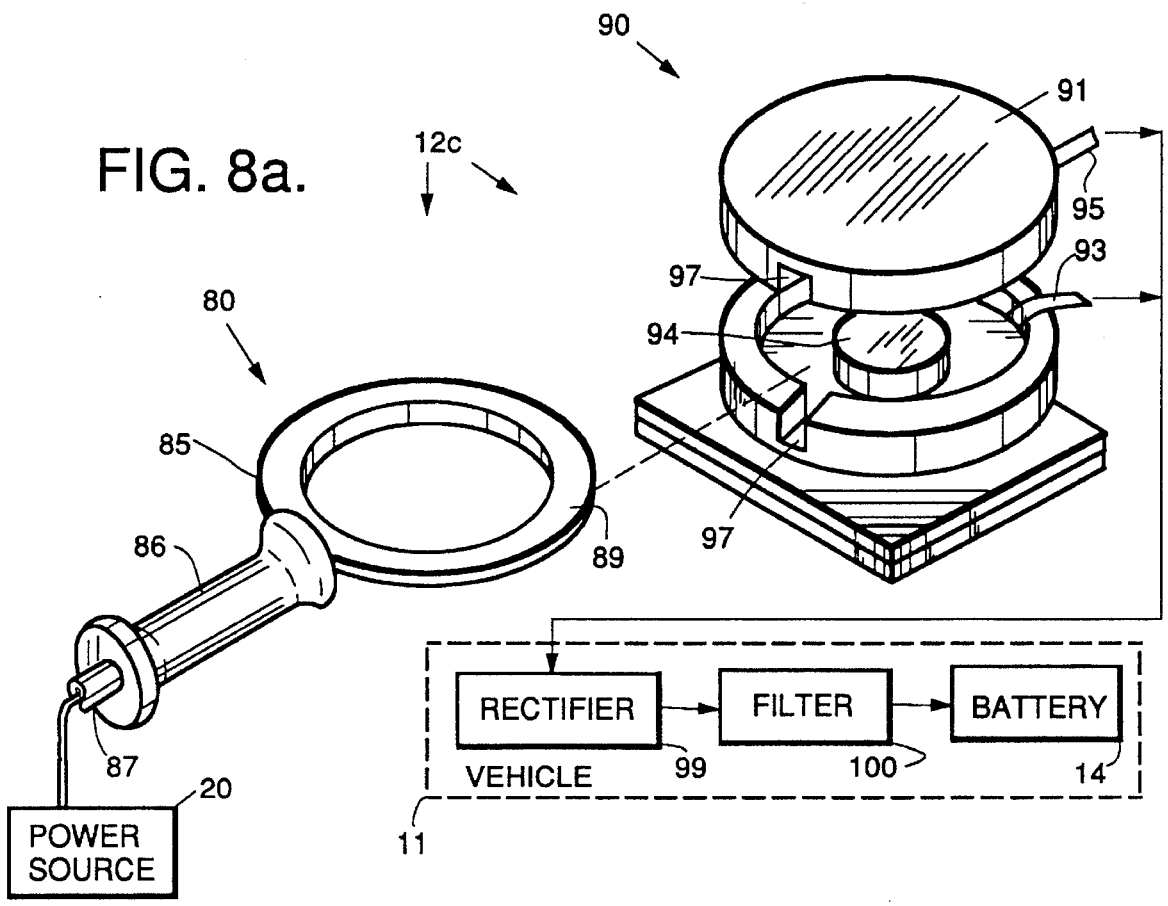
Figure 8B:
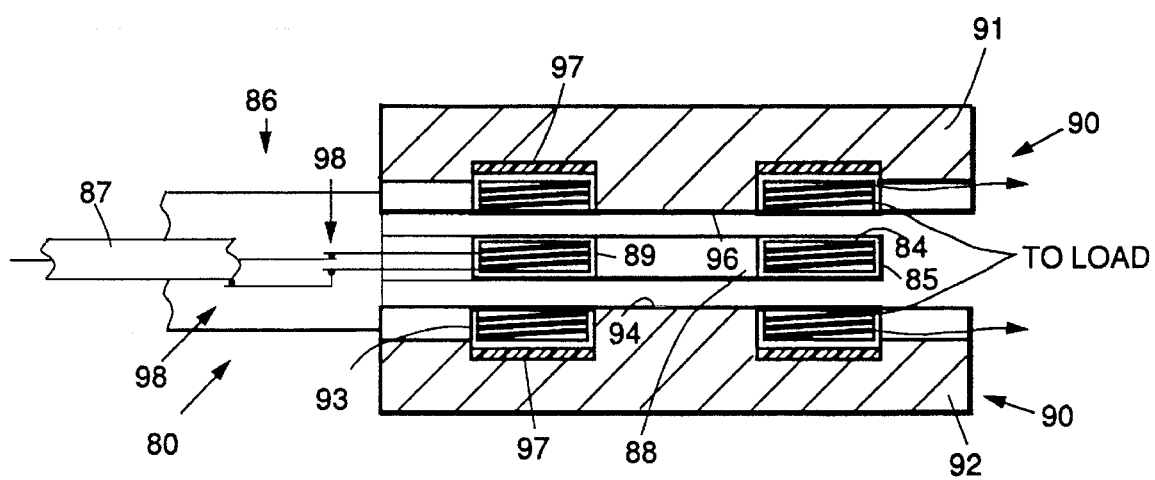

Referring to FIG. 8a, it shows a perspective view of the third charging device 12c comprising a separable inductive coupler 12c, while FIG. 8b shows a cross sectional view thereof. FIG. 8a shows the inductive third charging device 12c having its primary coil assembly 80 separated from a core assembly 90. FIG. 8b shows a cross section of the third charging device 12c showing the primary coil assembly 80 inserted between respective upper and lower core sections 91, 92 of the core assembly 90, and wherein the respective core sections 91, 92 are opened. The primary coil assembly 80 is comprised of a copper primary winding 84 wound in a flat helix shaped member having a relatively small thickness. The primary coil assembly 80 is enclosed in an insulated case 85 or housing 85 having a handle 86 on one end thereof that is used to insert and remove the primary coil assembly 80 from the core assembly 90. The insulated case 85 or housing 85 is comprised of an insulating material 89 such as phenolic plastic, for example. The primary coil assembly 80 is connected to a high frequency (current or voltage) power source 20 by way of a coaxial cable 87 or other low inductance transmission line. The primary winding 84 is soldered or welded 98 to the leads of the coaxial cable 87. The battery 14 is charged by way of a rectifier 99 and filter 100 serially coupled between the battery 14 and the coupler 12c (12a, 12b). These components comprise a load 101 that is connected to the charging device 12.

The core assembly 90 is comprised of upper and lower core sections 91, 92. Each core section 91, 92 comprises a magnetic core piece having a groove disposed therein into which respective secondary winding 93, 95 (FIG. 8a) disposed therein. A flexible high temperature member 97, for example, is disposed between each respective core section 91, 92 in the bottom of each of the grooves and its respective secondary winding 93, 95. The flexible member member 97 may be made of high temperature rubber, for example. The flexible member member 97 is used to compensate for any manufacturing tolerance errors to ensure that the secondary windings 93, 95 come in close contact with the primary winding 94 when they are mated together. Ferrite material may be used for the for the upper and lower core sections 91, 92 of the secondary coil 93.

Insulating material 89 is also disposed around the secondary windings 93, 95. Two center posts 94, 96 (FIG. 8b) are provided that insert into an opening 88 in the primary coil assembly 80 and primary winding 84 when the primary coil assembly 80 is mated with the core assembly 90. The mating surfaces of the two core sections 91, 92 should be made smooth and flat so that the gap between them is minimized. This provides for maximum coupling and performance when the two core sections 91, 92 are mated. Notches 97 are formed in the upper and lower core sections 91, 92 that are used to locate the primary coil assembly 80 relative to the upper and lower core sections 91, 92 of the core assembly 90. In the preferred embodiment shown in FIGS. 8a and 8b, the core assembly 90 is separated into two core sections 91, 92 to improve the primary to secondary coupling coefficient. This reduces leakage inductance and reduces copper power losses due to proximity (eddy current) effects. It is to be understood that the respective roles of the primary and secondary assemblies 80, 90 may be reversed.

The respective windings 84, 93, 95 are shown encapsulated in the insulating material 89 and the respective locations of the windings 84, 93, 95, the opening 88 in the primary coil 84 and the insertion of the respective posts 94, 96 into the opening 88 are illustrated. The windings 84, 93, 95 may be comprised of copper, for example, while the core sections 91, 92 may be comprised of ferrite, for example. The primary and secondary coil assemblies 80, 90 form a transformer when the respective primary and secondary windings 84, 93, 95 are mated.

A more complete understanding of the above-described three charging devices 12a, 12b, 12c may be had from a reading of the above-referenced patent applications.

Thus there has been described new and improved weatherized curb-side battery charging system that is adapted for use in charging electric automobile batteries, and the like. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A battery charging system for use in charging a battery of an electric vehicle, said battery charging system comprising:

a housing;

a power supply disposed within the housing;

electronic circuitry disposed within the housing that is adapted to control the amount of power supplied to the battery of the vehicle;

a retractable battery charging device disposed in the housing that is coupled to the power supply by way of the electronic circuitry and that has a primary coil assembly that can be mated with a secondary coil assembly disposed in the electric vehicle; and control electronics disposed in the housing that are coupled to the electronic circuitry and that are adapted to control the operation of the battery charging system in response to user provided inputs.

2. The battery charging system of claim 1 which further comprises a fan coupled to the electronic circuitry for forcing air through the system to remove heat therefrom.

3. The battery charging system of claim 1 wherein the control electronics comprises a card reader adapted to read a credit card type key inserted in order to operate the system.

4. The battery charging system of claim 1 wherein the retractable battery charging device comprises an inductive charger comprising:

said primary coil assembly additionally comprising a housing, a primary core disposed in the housing, a doughnut-shaped primary winding disposed in the primary core, and an electrical cable coupled to the primary winding that is adapted to couple power thereto from an external power source; and said coil assembly additionally comprising a receptacle housing that is matable with the removable primary coil assembly, a secondary core disposed in the receptacle housing, a doughnut-shaped secondary winding disposed in the secondary core that can be coupled to a battery; and retaining means for securably holding the primary coil assembly in close proximity to the secondary coil assembly so that the primary and secondary windings are adjacent to each other, wherein the primary and secondary coil assemblies form a transformer when the respective primary and secondary windings and primary and secondary coil assemblies are mated.

5. The battery charging system of claim 4 wherein the primary and secondary cores are comprised of ferrite material.

6. The inductive charger of claim 4 wherein the primary and secondary windings are comprised of copper.

7. The battery charging system of claim 1 wherein the retractable battery charging device comprises an inductive charger comprising:

said primary coil additionally comprising a housing having a handle, a primary winding having an opening therein that is disposed in the housing, and an electrical cable coupled to the primary winding that is adapted to couple power thereto from an external power source; and said coil additionally comprising first and second matable magnetic core sections, each core section having a secondary winding disposed therein can be coupled to a battery, the first and second matable magnetic core sections being separable to provide for open and closed positions, and wherein the primary coil is insertable between the respective first and second matable magnetic core sections when they are in the open position, and wherein the primary and secondary coils form a transformer when the first and second matable magnetic core sections are in the closed position.

8. The battery charging system of claim 7 which further comprises:

insulating material encapsulating each of the primary and secondary windings.

9. The battery charging system of claim 7 wherein the insulating material comprises nylon.

10. The battery charging system of claim 7 wherein the coils are comprised of copper.

11. The battery charging system of claim 10 wherein the coils are wound in a relatively flat helix shape.

12. The battery charging system of claim 7 wherein the first and second matable magnetic core sections comprise ferrite material.

13. The battery charging system of claim 7 which further comprises:

opening means for opening and closing the secondary core halves of the coupler.

14. The battery charging system of claim 13 wherein the opening means comprises:

a moveable member attached to the upper core section;

means for moving the moveable member up and down relative to the lower core section so as to alternatively mate and separate the upper core section from the lower core section; and tensioning means coupled to the moveable member for keeping the upper and lower core sections together when they are mated.

15. The battery charging system of claim 1 wherein the retractable battery charging device comprises an inductive charger comprising:

said primary coil assembly additionally comprising a housing, a primary core disposed in the housing, a primary winding protruding from the primary core, and an electrical cable coupled to the primary winding that is adapted to couple power thereto from an external power source; and said coil assembly additionally comprising a receptacle housing that is matable with the removable primary coil assembly, a secondary core disposed in the receptacle housing, first and second concentric secondary windings disposed in the secondary core that can be coupled to a battery and wherein the first and second concentric secondary windings have a gap therebetween that is adapted to receive the primary winding therein;

wherein the primary and secondary coil assemblies form a transformer when the primary and secondary windings and primary and secondary coil assemblies are mated.

16. The battery charging system of claim 15 wherein the primary and secondary cores are comprised of ferrite material.

17. The battery charging system of claim 15 wherein the primary and secondary windings are comprised of copper.

* * * * *